May 15, 1934. T. W. JOHNSON 1,958,625
CULTIVATOR
Filed Aug. 3, 1931 2 Sheets-Sheet 1
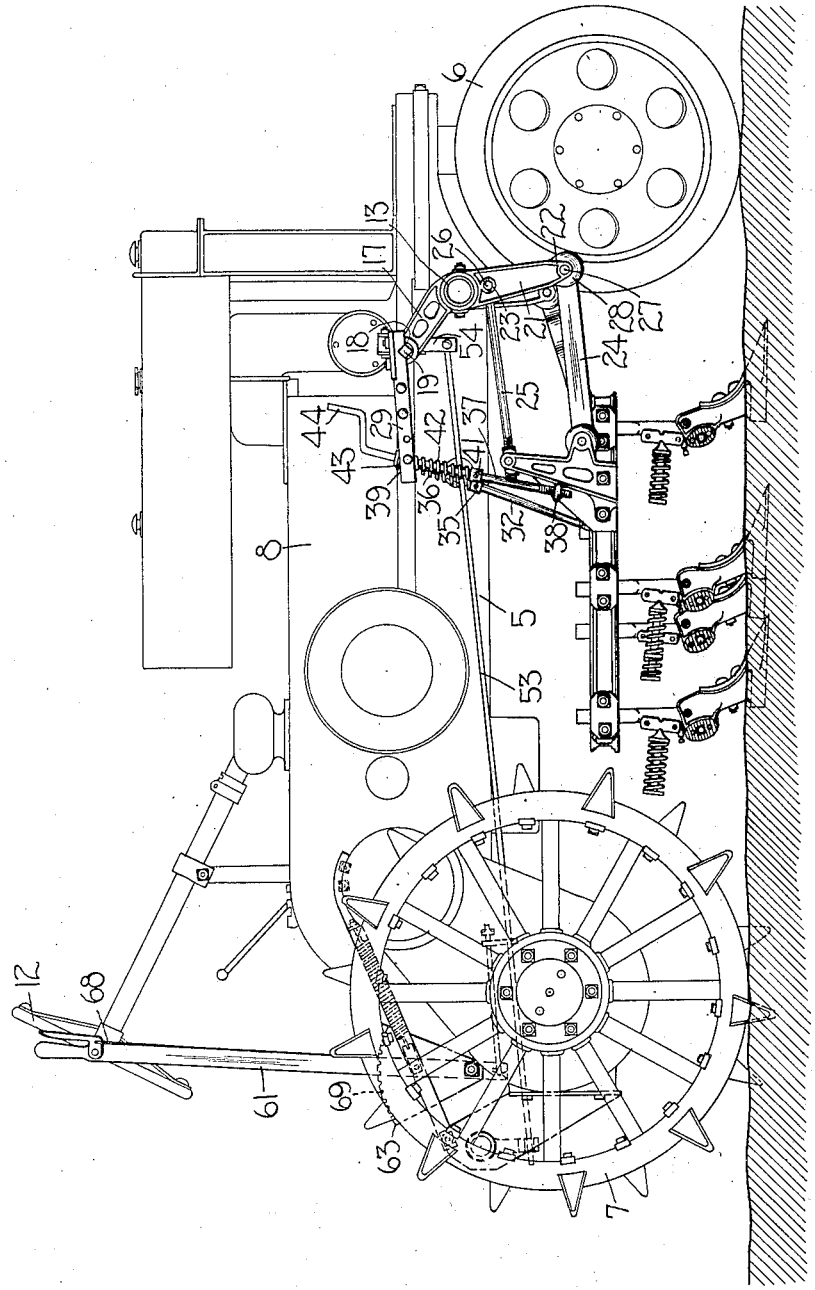
INVENTOR.
Theodore W. Johnson
BY Brown, Jackson
Boettcher+Dienner
ATTORNEYS.
WITNESS.
Edward Melin.

May 15, 1934.     T. W. JOHNSON     1,958,625
CULTIVATOR
Filed Aug. 3, 1931     2 Sheets-Sheet 2
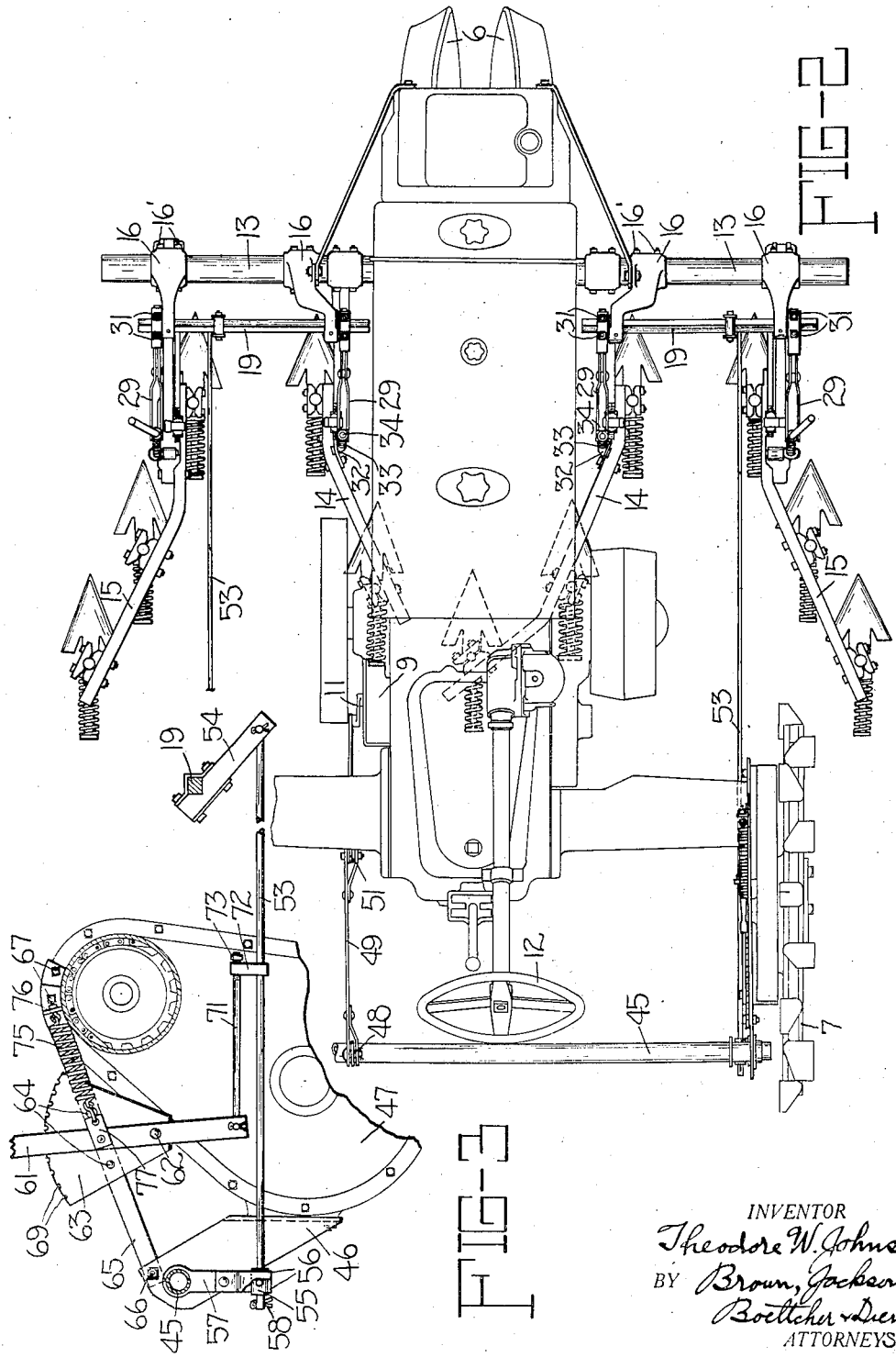

Patented May 15, 1934

1,958,625

UNITED STATES PATENT OFFICE 1,958,625

CULTIVATOR

Theodore W. Johnson, Moline, Ill., assignor to Deere & Company, Moline, Ill., a corporation of Illinois Application August 3, 1931, Serial No. 554,747

24 Claims. (Cl. 97—50)

This invention relates generally to cultivating implements of the type comprising an attachment adapted to be directly connected with a tractor so that the attachment and the tractor function together as a unitary, power operated cultivating implement, and in which the cultivating rigs are pivotally connected with the attachment frame whereby the shovel or shovels of the rigs are maintained in a definite angular relation to the ground in the vertical movement of the rigs relatively to the implement frame.

In prior implements of this type in which separate sets of cultivator rigs are positioned at opposite sides of the tractor and raised by power lift mechanism deriving power from the tractor engine it has been customary to raise all of the rigs of the attachment simultaneously. It has been found, however, that in the cultivation of terraced land, it is sometimes desirable to lift one or the other set of rigs into non-operating or raised position and hold it in such position while leaving the other set of rigs in operating or lowered position.

The principal object of my present invention therefore is to provide a separate set of cultivator rigs on each side of the implement so connected with the power lift mechanism as to be operated simultaneously by such mechanism, and to provide manually operated means on each side of the implement operative through the power lift connections whereby either set of rigs may be raised to and held in non-operating position independently of the set of rigs at the opposite side of the tractor, while permitting the set of rigs at such opposite side to be raised and lowered at the will of the operator by means of the power lift mechanism.

Another object of the invention is to provide such improved manually operable means at each side of the implement operating through the power lift connections whereby the depth of penetration of the set of rigs at either side of the implement may be adjusted independently of the set of rigs at the opposite side of the implement without affecting the operation of the power lift mechanism for raising both sets of rigs simultaneously to transport position.

A further object of the invention is to provide such improved means operating through the power lift mechanism for always raising both sets of rigs to the same height irrespective of the depth adjustment of either set of rigs.

A still further object of the invention is to provide improved means for connecting the rigs of each set with their common rock shaft whereby said rigs will be tied together by said shaft so that any tendency of one rig to lift itself out of the ground will be counteracted not only by its own weight but also by the weight of the other rig or rigs of that set and the downward pull of such other rig or rigs due to the suck of the shovels carried thereby.

Further objects and advantageous features will be apparent from the following description of my invention taken in connection with the accompanying drawings, in which—

Figure 1 is a side elevation illustrating a tractor equipped with my improvements;

Figure 2 is a top plan view of the same, partly broken away; and

Figure 3 is an enlarged detail view, partly broken away, illustrating the means provided on each side of the tractor whereby the set of rigs on one side of the implement may be raised manually independently of the set at the opposite side thereof, and showing also the connections between such means and the power lift mechanism whereby said means is operative through the power lift connections for both raising as well as adjusting the sets.

Referring to the drawings, the tractor comprises a suitable main frame structure 5 which is supported at its front end on two steering wheels 6 and at its rear end on two traction wheels 7. In the construction shown the two steering wheels 6 are disposed close together, comparable to a three-wheel tractor, but it is to be understood that the invention is also applicable to a four-wheel tractor wherein the two steering wheels are spaced relatively far apart. The tractor motor is represented by the horizontal cylinder engine indicated at 8, from which power is transmitted through any conventional arrangement of clutch, selective speed transmission, differential mechanism and driving means to the rear traction wheels 7. In order to utilize the power of the engine for lifting the cultivator rigs to transport position, the tractor is provided with a suitable power take-off device operatively connected with the engine and arranged to actuate a power lift clutch under the control of the operator.

This power lift mechanism is indicated generally by the numeral 9, and it is deemed unnecessary to describe the same specifically because the details thereof, per se, constitute no part of the present invention. It will suffice to say here that the power shaft extends laterally from such mechanism and supports a crank 11 adjacent to the side of the tractor from which lifting movement is transmitted to the cultivator rigs through mechanism which will be hereinafter described.

The front tractor wheels 6 are steered by means of suitable steering mechanism operatively connected at its front end with said wheels and at its rear end with a steering control wheel 12 located adjacent to the operator's seat (not shown) at the rear end of the tractor.

The implement frame comprises a frame bar 13 which extends transversely of the tractor adjacent its forward end, being supported in an opening in the lower side of the tractor housing in rear of the front steering wheels and extending outwardly laterally at each side of the tractor as shown. The general construction of this frame bar 13 and the means for connecting the cultivator rigs thereto is somewhat similar to that illustrated in Figures 8 and 9 of my pending application, Serial No. 485,844, filed October 2, 1930.

Supported on the frame bar 13 at each side of the tractor is a set of cultivator rigs, each set comprising an inner rig 14 and an outer rig 15, thereby providing a two-row cultivator, and for such construction the tractor is designed with each of its rear traction wheels 7 spaced a considerable distance from the body of the tractor, thereby permitting the two plant rows to pass between the traction wheels and the body of the tractor at each side thereof. It is to be understood, however, that my present invention is not to be limited to use in connection with a two row cultivator, as the frame bar 13 may be extended outwardly farther from each side of the tractor than as illustrated and provided with additional cultivator rigs to provide a four-row cultivator, as will be readily understood. Furthermore, by making the inner rigs long enough to carry two or more shovels as shown it has been found unnecessary to provide rear cultivator rigs such as those illustrated in my pending application above referred to.

Each cultivator rig is operatively connected with the frame bar 13 by means of a sleeve 16 engaging over the bar and secured thereto by two screws or bolts 16' extending transversely through the sleeve and bar, and said bar is provided with a plurality of spaced holes (not shown) for receiving the bolts 16' at different points therealong so that each sleeve 16 may be shifted in either direction along said bar for accommodating different row spacings between the pairs of rigs; in this respect the construction also being similar to that shown in my pending application above mentioned.

As best shown in Figure 1, an arm 17 projects upwardly and rearwardly from each sleeve 13 and has a bearing boss 18 formed at its outer end. A separate transversely extending rock shaft 19 is rotatably mounted in the several bearing bosses at either side of the tractor, as shown in Figure 2. Another arm 21 extends downwardly from each sleeve and has a bifurcated bearing portion 22 formed in its lower end. Each of said arms 21 is also provided at a point adjacent the sleeve 13 with a bearing portion 23. These two bearing portions 22 and 23 of each sleeve pivotally support the forward ends of two spaced substantially parallel links 24 and 25 which support the lower portion of the cultivator rig.

The upper link 25 has its forward end bent laterally, as at 26, to pass through the bearing 23, the bent end receiving a cotter pin or any other suitable retaining device on the opposite side of the bearing. The lower link 24 is pivotally mounted between the bifurcated ends of the bearing portion 22 by a pivot bolt 27, and this end of the link is formed with a flattened portion 28 of considerable area contacting with the flat surfaces of the bifurcated portion 22 whereby side play of the link 24 is substantially eliminated and the rig is accurately held in the desired line of travel. In this respect the construction of the present application is similar to that of my pending application above referred to, and the rear ends of said links 24 and 25 are connected with the rigs in the same manner as are the corresponding links in said application, so that it is not deemed necessary to describe such connections herein in detail. It will suffice to say that the rigs are lifted with a substantially parallel lift movement through the instrumentality of these links 24 and 25. The various cultivator shovels carried by each of the rigs are secured thereto in any suitable manner, such, for instance, as shown in my said pending application.

Each of the rock shafts 19 carried by the frame bar 13 at opposite sides of the tractor is square or polygonal in cross section. Clamped on each rock shaft by means of bolts 31 in the plane of each rig mounting sleeve is a rig lifting arm 29, said arms being bifurcated at their rear ends as best shown in Figure 2. These several arms may be adjusted along their respective rock shafts as desired along with their adjacent sleeves 16 by merely loosening the clamping bolts 31, as will be readily understood.

The inner rig of each set of rigs on opposite sides of the tractor is connected with its respective lifting arm 29 by means of a suitable link 32 pivotally connected at its lower end to the rig. The upper end of the link 32 extends through a collar 33 (see Figure 2) pivotally supported between the bifurcated rear ends of the lifting arm 29, and said link is held in position in said collar by means of a cotter pin 34 inserted in a hole in the upper end of said link above said collar. A collar 35 is secured to said rod 32 intermediate its ends as shown in Figure 1, and a coiled compression spring 36 is mounted on said rod between the collar 35 and the collar 33.

The outer rig of each set of rigs on opposite sides of the tractor is similarly connected with its respective lifting arm 29 on the rock shaft 19 by means of a rod 37, except that the lower end of said rod is screw-threaded as shown and threads into a nut 38 pivotally connected to the rig. The upper end of said rod extends through a collar 39, similar to the collar 33 and similarly pivotally supported between the bifurcated rear ends of its lifting arm 29. A collar 41, similar to the collar 35 on the link of the inner rig, is secured to said rod intermediate its ends as shown, and a coiled compression spring 42 is mounted on said rod between said collars 39 and 41. Fixed to the rod above the collar 39 is a third collar 43, and the upper end of the rod above this collar 43 is bent to form a crank 44. By rotating this crank the rod 37 may be threaded up or down through the nut 38 as desired, whereby the outer rig may be leveled with respect to the inner rig, as will be readily understood.

It will be seen from the foregoing that the two cultivator rigs of each set are tied together through their common lifting rock shaft 19 so that should one of the rigs of a set, for example the outer rig 15, encounter some difficult soil condition when in operation tending to raise the rig out of the ground, upward movement of such rig will be resisted not only by compression of the spring 42 but also by the weight of the inner rig, tied thereto through the common rock shaft, plus the downward pull due to the suck of the shovels of said inner rig.

The rocking of the front rock shafts 19 for lifting the rigs of each set at opposite sides of the implement into inoperative or raised position through the power lift mechanism, and also the rocking of said shafts for adjusting the depth at which the rigs of each set operate, is controlled by means which will now be described, and as such means is the same at both sides of the tractor a description of one will suffice.

Extending transversely of the tractor in rear thereof is a rock shaft 45 which is rotatably supported adjacent its opposite ends in brackets 46 secured to and extending upwardly and rearwardly from the chain housings 47 that enclose the driving chains for the two traction wheels 7 at opposite sides of the tractor. The rock shaft 45 is rocked from the power lift mechanism through connections comprising an upwardly extending arm 48 fixed to the rock shaft, link 49, pendulum 51 and link 52 connected with the crank 11, this construction being similar to that illustrated in my pending application.

A tension rod 53 extends longitudinally along each side of the implement as shown in Figure 1 and is pivotally connected at its forward end with an arm 54 fixed to and extending downwardly from the rock shaft 19 as shown. This rod has been termed a tension rod as it acts under tension during the lifting operation of the rigs, which is very desirable as a lighter construction of rod may be used than if said rod acted under compression during the lifting movement. The rear portion of the rod 53 extends through and is slidingly supported in a collar 55 pivotally mounted between the bifurcated lower ends 56 of an arm 57 secured to and depending from the rock shaft 45, and the rear end of said tension rod is provided with a cotter pin 58 as shown, or any other suitable stop means for preventing said collar from sliding off of said rod during the power lift raising of the rigs, as during such operation the arm 57 moves in a clockwise direction as viewed in Figure 3. As will be apparent from an inspection of the latter figure, the rocking of the rock shaft 45 in a clockwise direction causes no actuation of the tension rod 53 until the collar 55 strikes the stop 58, but thereafter further rotation of the rock shaft 45 causes a rearward movement of said rod which rocks the shaft 19 and raises the rigs.

A hand lever 61 is provided on each side of the tractor adjacent the rear end thereof for each set of rigs whereby the set of rigs at one side of the tractor may be adjusted independently of the set of rigs at the other side for varying the depth of penetration of the rigs, and said hand levers act in conjunction with the adjacent tension rods in this operation. As said hand levers and the parts connected therewith which will now be described are the same at both sides of the tractor a description of one will suffice. This lever, as best shown in Figure 3, is pivotally mounted at 62 on a notched sector plate 63 supported by two bolts 64 on a brace member 65 bolted at its rear end as shown at 66 to the upper end of the bracket 46 which supports one end of the rock shaft 45. The forward end of said brace member is secured to the flange of the chain housing 47 by means of bolts 67. It will be seen, therefore, that this brace member 65 performs the dual function of bracing the supporting bracket 46 and also providing a support for the notched sector plate 63 and hand lever 61. The hand lever 61 is provided with the usual detent 68 adapted to engage in one or another of the notches 69 in the sector plate 63 for holding the lever 61 in any one of its various adjusted positions.

Pivotally connected at its rear end to the lower end of the hand lever 61 and extending forwardly therefrom above and substantially parallel to the tension rod 53, as shown in Figure 3, is a longitudinally extending link 71, the forward portion of which extends through and rests loosely in an opening provided in the upper end of an arm or block 72 fixed at its lower end to the tension rod 53 and extending vertically therefrom. The forward end of the link 71 is screw threaded and is provided with a nut 73 on the outer portion thereof which acts as a stop for the link 71, the position of which stop may be adjusted by threading the nut 73 in one direction or the other, the purpose of which will be hereinafter more fully described.

As viewed in Figure 3 of the drawings, when the power lift mechanism of the tractor is operated to lower the rigs, the rock shaft 45 will be rotated in a counterclockwise direction, whereupon the rigs will drop down to operating position through the force of gravity and such downward movement of the rigs will turn the rock shaft 19 in a counterclockwise direction and by means of the arm 54 the tension rod 53 will be moved forwardly until the arm 72 thereon strikes the stop 73 on the link 71. It will be seen, therefore, that the position to which the rigs may be lowered is governed by the setting of the hand lever 61 which adjusts the fore and aft positions of the link 71 and the nut 73 thereon relative to the arm 72 on the tension rod 53. Swinging the hand lever forwardly, to the right as viewed in Figure 3, will move the link 71 with its nut 73 rearwardly or toward the left whereby the associated rigs will be adjusted for shallower depth because in the lowering movement of the rigs the tension rod will be prevented from moving toward the right as far as it is permitted to move with the parts in the position shown in Figure 3, whereas by swinging said lever rearwardly or to the left will move the link 71 with its nut forwardly or toward the right whereby the rigs will be adjusted for operating at a greater depth, as will be readily understood. Thus the lever 61 operates through the power lift linkage to limit or vary the depth adjustment of the rigs.

The hand levers 61 not only function to adjust the depth of penetration of the rigs of their respective sets, but they also function to raise their respective sets of rigs to inoperative position when desired, whereby one set of rigs may be held up in inoperative position while the other set is permitted to operate and may be raised and lowered by the power lift mechanism at will by the operator during such operation, which is particularly advantageous when operating on terraced land. When it is desired to raise the set of rigs at one side of the tractor and hold them in such raised position the hand lever 61 on that side of the implement is pushed forwardly or to the right as shown in Figure 3 to its farthest position and is locked to the sector plate by the detent 68 engaging in the forward notch 69 of said plate. In this movement of the lever the tension member 53 will be moved rearwardly, thus pulling rearwardly on the arm 54 secured to the rock shaft 19 and turning said rock shaft in a clockwise direction to raise the rigs connected thereto to inoperative position. During such movement the rear end of the tension rod slides rearwardly through the collar 55 at the lower end of the arm 57. It will be seen therefore that this movement of one tension rod does not move the arm 57 nor turn the rock shaft 45, whereby the tension member on the other side of the implement is not affected, and the set of rigs at that side will remain in operating position. The operating set of rigs may be raised by the power lift mechanism in the usual manner, and in this operation the tension rod 53 at that side of the implement is moved rearwardly by the swinging of the arm 57 on the rock shaft 45, the collar 55 on the arm contacting with the cotter pin 58 thereby moving said rod. During this movement of said rod the arm 72 will slide rearwardly along the link 71, as will be readily appreciated. When it is desired to again lower this same set of rigs to operating position the power operated mechanism is reversed to swing the rock shaft 45 in a counterclockwise direction, thereby moving the collar 55 on the arm 57 of the rock shaft in the same direction and away from the cotter pin 58 on the outer end of the tension rod 53, while at the same time the arm 72 moves forwardly along the link 71, whereby the rigs will drop by gravity down into operating position. During this rising and lowering movement of the set of rigs at one side of the implement under operation of the power lift mechanism the arm 57 on the opposite end of the rock shaft which controls the power lift for the set of rigs on the opposite side of the implement, which rigs are being held up in inoperative position by the hand lever 61 at that side of the implement, will merely slide back and forth on its tension rod 53, as said tension rod is at all times in its rearmost or rig lifting position, as will be readily understood.

Should one of the rigs of a set meet with some difficult soil condition as previously mentioned which is great enough to lift said rig together with the other rig of the set which is tied to it through their common rock shaft 19 as explained above, this movement will rotate the rock shaft and move the tension rod 53 connected therewith rearwardly, such tension rod sliding in the collar 55 and the arm 72 will slide on the link 71, whereby there will be no danger of breakage of any of the operating parts.

To aid the operator in manually lifting the rigs by operation of the lever 61 to adjust their depth of penetration or to raise said rigs to inoperative position a coiled spring 75 is provided for each of the levers 61, said spring being in expanded condition in all normal positions of the lever on the sector plate. Said spring is connected at its forward end to a bracket 76 secured to the forward end of the brace bar 65 by one of the bolts 67 which secure said bar to the flange of the chain housing 47, while the rear end of said spring is fixedly connected to a clip 77 secured to the lever 61 above its point of pivotal connection with the sector plate 63. It will thus be seen that when the operator moves the lever toward the right as shown in Figure 3, by which movement the rigs are raised, the spring will aid the operator in moving said lever.

I claim:—

1. The combination with a tractor, of a tillage implement connected with said tractor and comprising a frame bar, a set of at least two cultivator rigs carried by said frame bar on each side of the tractor, lifting means for raising both sets of rigs simultaneously, and means at each side of the tractor having lost motion connection with said lifting means for raising the set of rigs at either side independently of the set at the other side.

2. The combination with a tractor, of a tillage implement connected with said tractor and comprising a frame bar, a set of cultivator rigs carried by said frame bar on each side of the tractor, power lift mechanism deriving power from the tractor motor for raising both sets of rigs simultaneously including an operating member for each set, and separate manually operated means including parts engageable, respectively, with said members and operable to shift the same in one direction only for raising each set of rigs independently of the other.

3. The combination with a tractor, of a tillage implement connected with said tractor and comprising a frame bar, a set of cultivator rigs carried by said frame bar on each side of the tractor, power lift mechanism for raising both sets of rigs simultaneously to inoperative position including a pair of rock shafts carried by said bar, one for each set of cultivator rigs, and separate power actuated connections for operating each of said rock shafts, and manually operated means operable through the respective connections for raising the set of rigs at either side to an inoperative position independently of the set at the other side, said manually operated means being so connected therewith that the power lift means is operable to raise said other set of rigs.

4. The combination with a tractor, of a tillage implement connected with said tractor and comprising a frame bar, a set of cultivator rigs carried by said frame bar on each side of the tractor, earth working tools carried by said rigs, power lift mechanism for raising both sets of rigs simultaneously including a transversely extending member at each side of the tractor and connected with the set of rigs at that side to raise the same, both of said transverse members being carried by said frame bar, separate manually operated means for raising each set of rigs independently of the other, the manually operated means of each set being operable to vary the depth of penetration of the earth working tools of its respective set of rigs independently of those of the other set of rigs and including lost motion connections to both of said transverse members, providing for operation thereof by both said power lift mechanism and said manually operated means.

5. The combination with a tractor, of a tillage implement connected with said tractor and comprising an implement frame, a cultivator rig carried by said frame on each side of the tractor, a separate operating member for raising each rig, power lift means including a lost motion connection for each of said members for raising said cultivator rigs simultaneously, and separate means also including lost motion connections for raising each rig independently of the other.

6. The combination with a tractor, of a tillage implement connected with said tractor and comprising a frame bar, a set of cultivator rigs on each side of the tractor, means connecting each of said rigs with said frame bar to permit said rigs to rise and fall relatively to said frame bar, power lift means including separate power actuated members disposed on opposite sides of the tractor and reacting against said frame bar for raising both sets of rigs simultaneously, and separate means having lost motion connections, one associated with each of said members, for raising each set of rigs independently of the other.

7. The combination with a tractor, of a tillage implement connected with said tractor and comprising a frame bar extending laterally at opposite sides thereof, a set of cultivator rigs carried by said bar on each side of the tractor, a pair of separate rock shafts, one carried by said frame bar on each side of the tractor and connected with said rigs to raise and lower the same, a third rock shaft supported on the tractor, a tension link on each side of the tractor connecting said first mentioned rock shafts with said third rock shaft, power lift mechanism deriving power from the tractor motor and operatively connected with said third rock shaft for raising and lowering said rigs, and manually operated means for each set of rigs mounted on the tractor and having lost motion connection with the adjacent tension link for adjusting the depth of penetration of its set of cultivator rigs independently of the other set.

8. The combination with a tractor, of a tillage implement connected with said tractor and comprising a frame bar extending laterally at opposite sides thereof, a set of cultivator rigs carried by said bar on each side of the tractor, a rock shaft carried by said frame bar on each side of the tractor, and connected with said rigs to raise and lower the same, a third rock shaft supported on the tractor, a tension link on each side of the tractor connecting said first mentioned rock shafts with said third rock shaft, power lift mechanism deriving power from the tractor motor and operatively connected with said third rock shaft for raising and lowering said rigs, and manually operated means for each set of rigs mounted on the tractor and having lost motion connection with its adjacent tension link for adjusting the depth of penetration of its set of cultivator rigs independently of the other set, each of said manually operated means being operable to raise and hold in inoperative position its set of rigs while permitting operation of the other set by the power lift mechanism.

9. The combination with a tractor, of a tillage implement connected with said tractor and comprising a frame bar, a set of cultivator rigs carried by said frame bar on each side of the tractor, power operated means for raising both sets of rigs simultaneously by power derived from the tractor motor, said means comprising a longitudinally movable tension rod operatively connected with each set of rigs, and manually operated means connected with each of said tension rods through lost motion connections for moving said rods longitudinally for raising the rigs at one side of the tractor independently of those at the other side of the tractor, said lost motion connections providing for raising said sets of rigs independently of said manually operated means.

10. The combination with a tractor, of a tillage implement connected with said tractor and comprising a frame bar, a set of cultivator rigs carried by said frame bar, power operated means for raising the rigs by power derived from the tractor motor, said means comprising a longitudinally movable tension rod operatively connected with the rigs, separate manually operable means for raising and lowering the rigs, said manual means also including a longitudinally movable tension rod, and sliding connections between the two tension rods and between the first tension rod and the power operated means whereby either the power means or the manual means is operable to raise the rigs independently of the other means.

11. The combination with a tractor, of a tillage implement connected with said tractor and comprising a frame bar, a set of vertically adjustable cultivator rigs carried by said frame bar on one side of the tractor and including a movable member associated therewith for shifting said rigs, means for lifting said rigs including means movable into engagement with said member from one direction only for shifting the same, and means connecting the rigs of said set together whereby the weight of all of said rigs assist in holding each of said rigs in proper cultivating position when said set of rigs is lowered to such position.

12. The combination with a tractor, of a tillage implement connected with said tractor and comprising a frame bar, a plurality of cultivator rigs pivotally connected to said frame bar, power lift means for raising and lowering said rigs, means connecting said rigs together whereby the weight of all of said rigs assist in holding each of said rigs in proper cultivating position when said rigs are lowered to such position, said power lift means including a sliding connection whereby all of said rigs may move upwardly regardless of the position of said power lift means.

13. The combination with a tractor, of a tillage implement connected with said tractor and comprising a frame bar, a set of cultivator rigs pivotally connected to said frame bar on each side of the tractor, means connecting the rigs of each set together whereby the weight of all of said rigs assist in holding each of said rigs in proper cultivating position when said set of rigs is lowered to such position, and means including a member operable in one direction only for raising the rigs at both sides of the tractor to a given position but providing for the continued upward movement of the rigs at one side beyond said position independently of the rigs at the other side.

14. The combination with a tractor, of a tillage implement connected with said tractor and comprising a frame bar, a set of cultivator rigs carried by said frame bar on each side of the tractor, power operated lifting means including lost motion connections for each set of cultivator rigs for raising and lowering both sets simultaneously, and manually operated means for raising and holding in inoperative position either set of rigs independently of the other set of rigs whereby said other set of rigs may be raised and lowered by said power operated lifting means independently of the set of rigs being held in inoperative position.

15. The combination with a tractor, of a tillage implement connected with said tractor and comprising a frame bar, a set of cultivator rigs carried by said frame bar on each side of the tractor, power operated lifting means for raising either or both of said sets of rigs, a manually operated lifting means connected with each set of rigs for raising said rigs to inoperative position, each of said lifting means including slip connections associated with said rigs and effective in one direction only, and tension means cooperatively associated with said manually operated lifting means and tending normally to aid the manually operated lifting means in its lifting movement.

16. The combination with a tractor, of an earth working implement connected with the tractor and comprising a frame bar, earth working tools carried by said frame bar on each side of the tractor, a shiftable member associated with the tools on one side of the tractor for raising the tools, a second shiftable member associated with the tools on the other side of the tractor for raising the tools at that side, power operated means movable into contact with both of said shiftable members for raising and lowering all of said earth working tools simultaneously, and manually operated means including separate parts movable individually into contact with said shiftable members for raising and holding in inoperative position the earth working tools on either side of the tractor independently of those on the other side of the tractor whereby said power operated means is operative to raise and lower the operating earth working tools.

17. The combination with a tractor, of an earth working implement connected with the tractor and comprising a frame bar, earth working tools carried by said frame bar on each side of the tractor, power operated means for raising and lowering all of said earth working tools simultaneously, and manually operated means having a lost motion connection with said power operated means whereby said manually operated means is operable to raise the earth working tools on either side of the tractor independently of those on the other side thereof.

18. The combination with a tractor, of a tillage implement connected with said tractor and comprising a frame bar, a set of cultivator rigs carried by said frame bar on each side of the tractor, means connecting the rigs of each set together whereby the weight of all of said rigs assist in holding each of said rigs in proper cultivating position when said set of rigs is lowered to such position, means including a member operable in one direction only for raising the rigs at both sides of the tractor to a given position but providing for the continued upward movement of the rigs at one side beyond said position independently of the rigs at the other side, and manually operable means to effect further upward movement of the rigs beyond the position determined by said rig raising means.

19. The combination with a tractor, of a tillage implement connected therewith and comprising a frame bar, a plurality of cultivator rigs carried by said frame bar with at least one rig on each side of the tractor, an operating connection disposed on each side of the tractor and associated with the rigs on that side for raising and lowering the same, a power operated rock shaft carried by the tractor and including a pair of arms, one movable into contact with each of said connections to shift said rigs simultaneously, and a pair of manually operated levers, one movable into contact with each of said connections, whereby either the power means or the manually operated means is operable to raise the rigs independently of the other means.

20. The combination with a tractor, of a tillage implement connected therewith and comprising a supporting frame bar, a plurality of groups of cultivating tools, each group consisting of at least one tool, an operating member for each of said groups for raising and lowering the same, lifting means for said tools comprising shiftable means actuatable through a given displacement and having a connection with each of said operating members for moving the latter in one direction but providing for movement of any of said operating members in that direction relative to said shiftable means, and separate means for positioning said tools and including a second shiftable means also having a connection with said operating members for shifting the latter in said one direction but permitting said operating members to move relative to said second shiftable means in said one direction, whereby said tools may be positioned by either of said shiftable means.

21. The combination with a tractor, of a tillage implement connected therewith and comprising a supporting frame bar, a plurality of groups of cultivating tools carried thereby, each of said groups consisting of at least one cultivating tool movable in a generally vertical direction relative to said frame bar, an operating member for shifting each of said groups vertically, lifting means for said tools including a rock shaft, a plurality of arms thereon, one for each of said operating members and having a sliding connection therewith operable to shift said members in one direction but providing for movement of said members relative to said arms, and separate means for shifting each of said operating members independently of the other members and independently of said lifting means, each of said separate means also including an arm having a sliding connection with the associated operating member and adapted to shift the latter in said one direction independently of said lifting means.

22. The combination with a tractor, of a tillage implement connected therewith and comprising a supporting frame bar, a plurality of groups of cultivating tools carried thereby, each of said groups consisting of at least one cultivating tool movable in a generally vertical direction relative to said frame bar, an operating member for shifting each of said groups vertically, lifting means for said tools including a rock shaft, a plurality of arms thereon, one for each of said operating members and having a sliding connection therewith operable to shift said members in one direction but providing for movement of said members relative to said arms, and separate means for shifting each of said operating members independently of the other members and independently of said lifting means, each of said separate means also including an arm having a sliding connection with the associated operating member and adapted to shift the latter in said one direction independently of said lifting means, said lifting means being adapted to move the first mentioned arms through a given displacement and said separate means including latch means adapted through the associated connections to retain each of the operating members in adjusted position.

23. An agricultural implement comprising the combination with a tractor having a motor, of a cultivator rig at each side of the tractor and carrying soil tilling tools, lifting means operable to lift the rigs including a movable member at each side of the tractor, each of said lifting means including a rock shaft connected with the rigs at that side of the tractor, an arm carried by the rock shaft, and an operating member extending generally longitudinally of the tractor and connected with said arm, power lift mechanism actuated by the power of the motor and including a rear rock shaft having operating arms thereon, each of said operating arms being adapted to be moved into engagement with one of the operating members to shift the same in one direction, and manually operated means associated with said longitudinally extending operating members and adapted to shift the respective operating members relative to said operating arms, whereby said manual operating means positions the cultivating tools independently of the power operated means.

24. The combination with a tractor, of a tillage implement connected with the tractor and comprising two sets of cultivator rigs carried thereby, power lift mechanism deriving power from the tractor motor for raising both sets of rigs simultaneously and including an operating member for each set, and separate manually operated mechanism including parts engageable, respectively, with said members for raising each set of rigs independently of the other, each of said mechanisms being arranged to be unaffected by operation of the other mechanism.

THEODORE W. JOHNSON.